Figure 6:
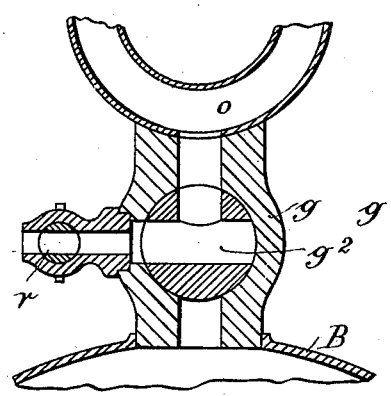

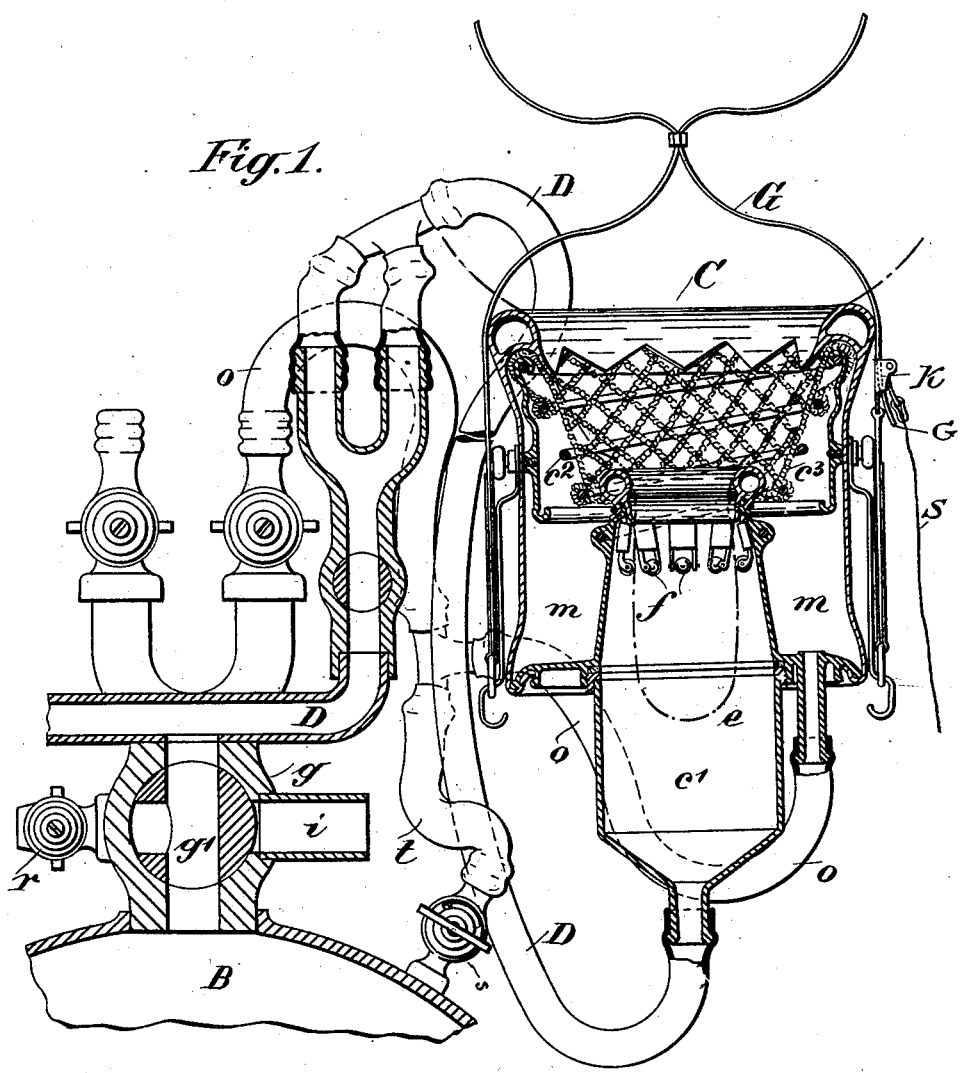

No. 673,297. Patented Apr. 30, 1901.
G. SIEMSGLÜSS & G. DASEKING.
MILKING MACHINE.
(Application filed Feb. 4, 1899.)
(No Model.) 4 Sheets—Sheet 2.
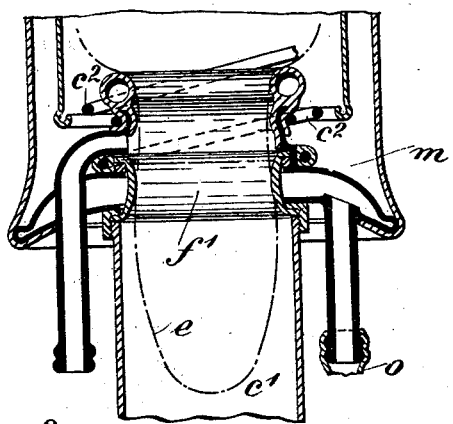
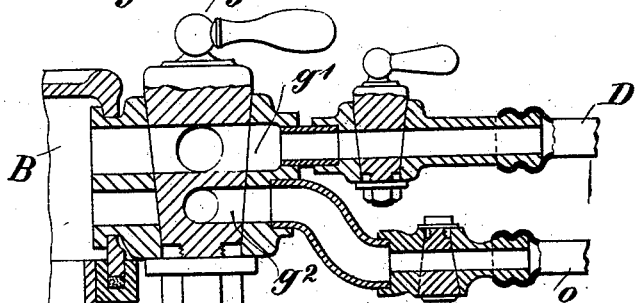
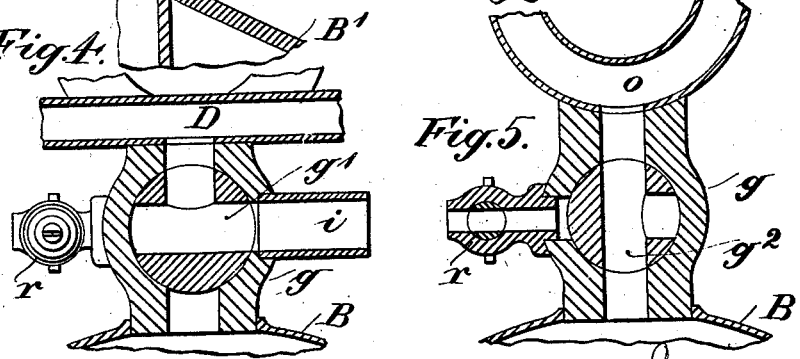

No. 673,297. Patented Apr. 30, 1901.
G. SIEMSGLÜSS & G. DASEKING.
MILKING MACHINE.
(Application filed Feb. 4, 1899.)
(No Model.) 4 Sheets—Sheet 3.

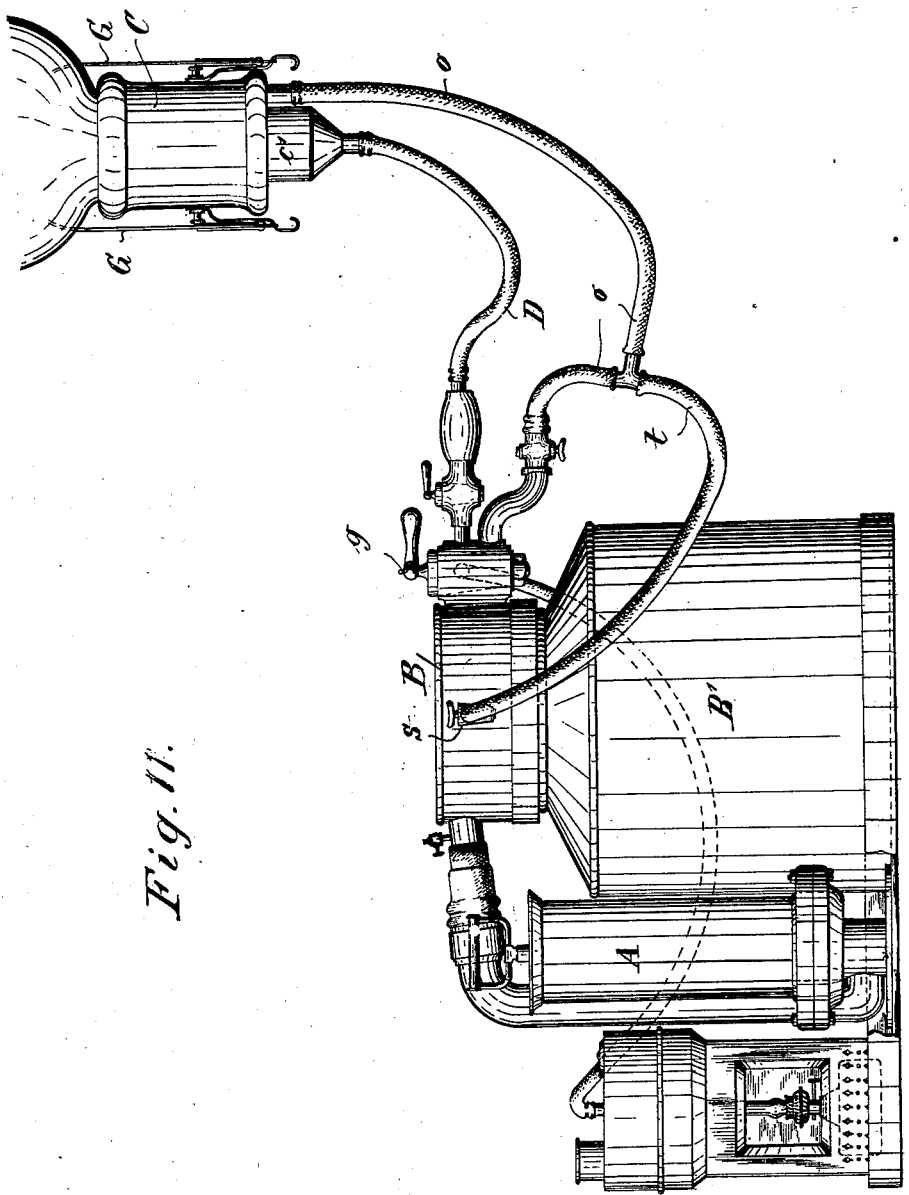

UNITED STATES PATENT OFFICE.

GEORG SIEMSGLÜSS AND GEORG DASEKING, OF HANOVER, GERMANY.

MILKING-MACHINE.

SPECIFICATION forming part of Letters Patent No. 673,297, dated April 30, 1901.

Application filed February 4, 1899. Serial No. 704,557. (No model.)

*To all whom it may concern:*

Be it known that we, GEORG SIEMSGLÜSS, merchant, of 17 Rüterswordstrasse, and GEORG DASEKING, manufacturer, of 179 Celler Chaussee, Hanover, Germany, have invented an Improvement in Milking-Machines, of which the following is a specification.

Vacuum milking machines and apparatus are divided into two classes—viz., those which press the milk out and those which suck it out. There has been, however, up to the present no practically useful example of either class, and the reason is that milking is not a purely mechanical process, but that a physiological stimulation—viz., the stimulation of the nerves—plays an important part in it, and this has been hitherto overlooked. The milk is formed in microscopically small vesicles, of which groups, from three to five in number, are arranged around an open duct. These ducts open into larger ducts, which all empty themselves into the so-called "milk-bag." From the milk-bag there is an outlet-duct, which is kept closed by flat constricting-muscles. It has been held hitherto that the milk collected in the milk-bag is in consequence of gravitation and that only the resistance which the constricting-muscles of the outlet-duct offered to the flow of milk was to be overcome; but this is not so. The milk does not collect in the milk-bag from the numerous side ducts in consequence of gravitation. This is, indeed, impossible, since the extreme branches of the duct system have openings in the gland which are smaller than the transverse section of a horsehair. In these narrow ducts capillary attraction and friction are more powerful than gravitation. Accordingly it is only the milk which is in the proportionately rather large ducts which flows into the milk-bag by gravitation, while, on the other hand, the larger quantity, which is contained in the numerous minute ducts, cannot be brought down by means of gravitation. This fact having been overlooked hitherto, all previously-known milking machines and apparatus work so inefficiently that, as was observed before, they are practically useless. In order to extract the milk from the minute ducts and to make it pass into the larger ducts, nerve stimulation must be applied, which has the effect of compressing the minute ducts, and thus the milk is squeezed out from them. If the sensual nerves which are called into action for this purpose are excited to a high degree, then the stimulation in the case of a cow with not too strong constricting-muscles is so great that not only is the milk from all the ducts pressed into the milk-bag, but an effect is produced upon the gland which is stronger than the muscle which constricts the outlet duct of the milk-bag, so that the milk spurts out. It follows, therefore, from these considerations that a cow must be put under the influence of sensual stimulation before she will yield the whole of the milk contained in the gland. It must now be observed that in the majority of cases this sensual stimulation is produced by up and down friction on the teat and by gently pressing and stroking the udder.

The new process of milking with the aid of apparatus is based upon the principles just enunciated. In it suction is only resorted to so far as is necessary to overcome the resistance of the constricting-muscles. In order to bring the milk first from the small ducts into the larger ones and into the milk-bag, the teats are moved up and down on a stroking apparatus, whereby the udder is at the same time lightly massaged, so that in consequence of the sensual stimulation which is produced in the cow by means of stroking the teat the minute ducts are compressed and the milk is squeezed from these into the larger ones and from thence into the milk-bag. Thus cows yield their milk freely and spontaneously. The up-and-down stroking movement of the teat and the massaging of the udder are brought about by means of a vacuum produced by an air-exhaust device A, of common form, and this with the assistance of a receptacle which consists of an inner and outer chamber so arranged that by means of a system of valves both the inner and outer chamber are alternately brought into connection with the vacuum and the outer air, so that the teat is continuously moved up and down and subjected to friction by an apparatus applied to it.

Figure 7:
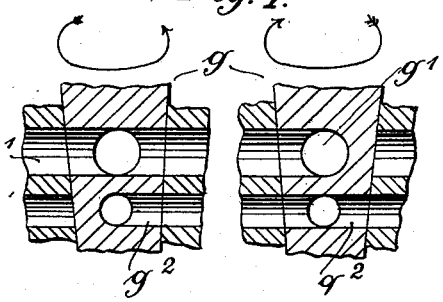
Figure 8:
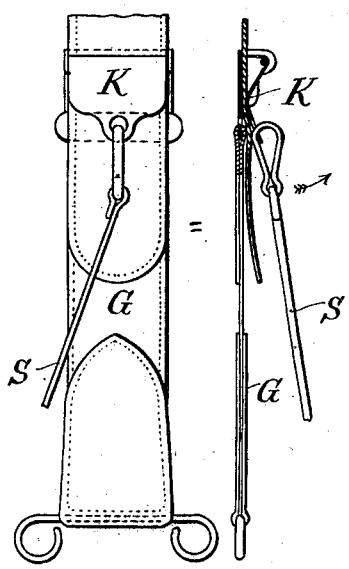
Figure 9:
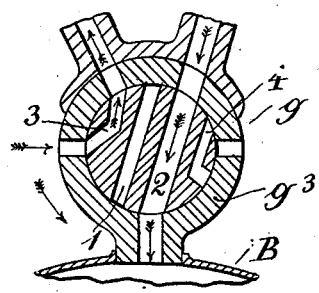
Figure 10:
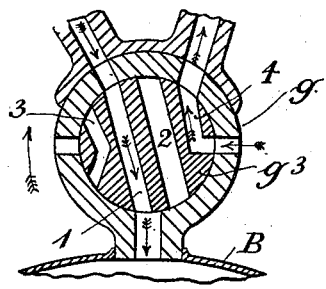

In the accompanying drawings, Figure 1 is a vertical section of the vacuum apparatus in connection with the milk-tank. Fig. 2 is a vertical section illustrating a modification thereof. Fig. 3 is a section of the pressure-controlling cock and its accessories. Figs. 4, 5, and 6 are sectional views showing the different positions of the regulating-cock during the operation of the apparatus, as hereinafter explained. Fig. 7 comprises two sectional views showing the ports of the regulating-cock in two different positions. Fig. 8 represents in front and side view a suspending strap for the milk-tank. Figs. 9 and 10 are sectional views showing in two different positions a regulating-cock of modified construction. Fig. 11 is an elevation of the entire machine in position for use.

The receptacle C, Fig. 1, consists of an inner chamber $c'$ and an outer chamber $m$. The shell of the outer chamber $m$ rests on the rim of the inner chamber $c'$, together with the spiral spring $c^2$, which has network $c^3$ overlying it. In the inner chamber $c'$ there are pendent rollers $f$ or an india-rubber mount $f'$, Fig. 2, or some similar flexible contrivance is employed which may be easily applied to the teat $e$ and may exercise frictional influence upon it. Some of the parts of receptacle C are made of thick rubber and are elastic, especially those which are in contact with the udder or the teats, respectively. Thus the whole wall of the udder-chamber, which is serrated in its upper inner portion, consists of rubber, and also the annular cushion above the rollers $f$. The rollers $f$ themselves are made of hard rubber. The lower inserted part of the chamber $c'$ consists, preferably, of celluloid. The remaining parts of the milk-receptacle are made of sheet metal and steel.

The valve arrangement on the vacuum vessel B of the receiver B' consists of a double three-way cock $g$, of which the ways $g'$ $g^2$ are arranged at an angle of ninety degrees to each other. The way $g'$ is in connection with the receptacle-chamber $c'$, in which the teat $e$ hangs by means of the tube D. By turning the cock $g$ ninety degrees this inner chamber $c'$ is by means of the way $g'$ at one time placed in connection with the receiving vessel B and at another time with the outer air. The second way $g^2$ of the cock $g$, which is arranged at an angle of ninety degrees to the first way $g'$, communicates with the outer chamber $m$ through the medium of the tube $o$. By turning the cock ninety degrees the outer chamber $m$ is also at one time connected with the receiving vessel B and at another time with the outer air. There is thus alternately established in the one chamber a vacuum and in the other the ordinary atmospheric pressure. Upon turning the cock $g$ a connection is established by means of the upper way $g'$ between the receiver B, in which is a vacuum, and the inner chamber $c'$, and a vacuum is likewise produced in the chamber $c'$, in consequence of which the teat $e$ is drawn down into this chamber. In this position of the cock $g$, Figs. 1, 3, and 6, the lower way $g^2$, which is below the upper way $g'$, is cut off from the receiving vessel B, so that by means of the pipe $o$ the outer chamber $m$ is in connection with the outer air. Through this connection of the way $g'$ with the receiving vessel B the teat is thus drawn downward between the rubbers $f$ or $f'$, whereby they exercise frictional influence upon it. If the cock $g$ is now turned ninety degrees, as in Figs. 4 and 5, the reverse process takes place. The air is now drawn out from the outer chamber $m$ by means of the pipe $o$ into the receiving vessel B. In consequence of this, part of the udder is, owing to the resulting vacuum, forced by suction tightly against the rim of the chamber $m$, and the teat $e$ also passes back, as the part of the udder to which it is attached is firmly held, and the vacuum in the inner chamber $c'$ is put an end to. When the teat $e$ ascends, it again rubs itself on the rubbers $f$ or $f'$. By continuing to turn the cock $g$ to and fro the teat $e$ is also continuously and instantaneously subjected to the friction of the rubbers $f$ or $f'$, while at the same time the udder, against which the whole receptacle (in consequence of the effect of the spring $c^2$) is intermittently pressed, is massaged as a consequence of the up-and-down pressure. By this means the nerve stimulus mentioned above is induced, so that the milk flows out in a strong stream. As soon as the milk begins to flow properly the cock is no longer turned, except when the inner receptacle vessel $c'$ is full of milk, in order to draw it off into the receiving vessel B. The more the udder is emptied the slacker it becomes, and it passes more and more into the chamber $c'$ and fills this up completely, so that at times the teat is liable to be forced against the lower wall of the receptacle, whereby the outlet-opening of the teat might be closed. In order to avoid this, a pipe $t$ is branched off from the pipe $o$, which leads to the outer chamber $m$, which pipe is in direct connection with the receiving vessel B, from which it can be cut off by means of the cock $s$. In the port leading to the lower way $g^2$, which establishes connection with the outer air, a cutting-off cock $r$ is arranged. If the nerve stimulus is now in operation and the milk flows strongly and milking is going on, then the cock $s$ is opened, whereby the outer chamber $m$ is put into continuous connection with the receiving vessel B, and thus a continuous vacuum is produced in the chamber $m$. The cock $r$ is at the same time closed, so that the outer air cannot enter. In this way the portions of the udder surrounding the teat $e$ are prevented from passing into the chamber $c'$. These portions of the udder are surrounded by the massage-spring $c^2$. Between this spring and the udder a network of felt or wadding or other material $c^3$, permeable by air, is laid, which has a double effect. In the first place it prevents the udder from coming into contact with the cold spring and also insures that the suction-surface applied to every udder is sufficiently large to hold the udder tight and also that the udder-chamber is adjusted to every udder, as is seen from what follows. Teats are of various sizes, and the portions of udder surrounding the teats are of different conformations. Every receptacle must suit all teats, while its size is restricted to definite dimensions. A receptacle must not be so large that a very small udder would have no contact with it. On the other hand, in the case of flat udders, which therefore have a proportionately poor seat on the spring $c^2$, and therefore only afford a small suction-surface, the receptacle must be of such a kind that the suction-surface must also hold the udder fast. The portions of the surface of the udder which lie against the wire of the spring are wasted for suction purposes. Only the portions which lie between the coils are subjected to suction. If the parts of the udder which lie upon the wire could also be successfully used for suction purposes, then there would be a receptacle with large enough suction-surface for all cases, so that every udder could be held fast. This effect is attained by a layer of network wadding, felt, &c., inserted between udder and spring. The air-permeable layer is only in contact with the spring where the cord comes, so that between the cords the udder is out of connection with the wire and is thus free, so that this surface is enough for suction purposes. The frequent openings in the network insure the adequate size of the suction-surface. Besides the network prevents the parts of the udder from being caught between the coils of the spring.

An apparatus is provided with several receptacles, so that more than one cow can be milked from more than one teat at the same time. Each receptacle is suspended by a belt G, of elastic material, which makes it possible for a receptacle to be removed easily from one teat and transferred to another, and which, further, in consequence of its elasticity, renders possible the massaging of the udder mentioned above by the receptacle, as the receptacle can be intermittently pressed against the udder. The belt G is provided with a small buckle K, on which there is a cord S. This buckle K is so shaped that it can be unfastened by pulling up the cord S, so that thus, if the cord is pulled, the belt G is separated, in consequence of which the receptacle falls away from the teat. A man can thus, without being in contact with the cow or the receptacle, at once remove the receptacle from the teat. The apparatus $g$ can have any suitable arrangement which renders the whole operation of milking possible by a simple up-and-down motion. In Figs. 9 and 10, for instance, a second design for this apparatus is given. Here the ways for the inner and outer receptacle-chambers are in one plane of the cock $g^3$, and consequently only one entrance is necessary for the receiving vessel B. The cock $g^3$ has two parallel bores 1 and 2, as well as two bores at an angle, 3 and 4. In the position Fig. 9 the inner receptacle-chamber $c'$ is in connection with the receiving vessel B through the bore 2. The milk flows in the direction of the arrow in way 2 through the cock into the receiving vessel B. On the other hand, the outer air has access to the outer receptacle-chamber through the angle-way 3, and it passes through the cock in the direction of the arrow 3. In position Fig. 10 the reverse is the case. Here the outer receptacle-chamber is in connection with the receiving vessel B by means of the way C. The air passes from $m$ in the direction of the arrow 1 to the receiving vessel B. The angle-way 2 is, on the other hand, closed, and in this position the angle-way 4 is open, by means of which the outer air passes into the inner receptacle vessel $c'$.

The vacuum or suction hereinbefore referred to may be produced by an exhaust apparatus or air-pump A, of common form. (See Fig. 11.) The operation is as follows: At the beginning of the milking operation the upper duct $g'$ of the cock $g$ is connected with vacuum-receiver B. The small air-cock $r$, which is arranged in the line of the lower duct $g^2$ of cock $g$, is then opened. By suitably turning the cock $g$ intermittent suction is produced in the chamber $c'$ of the milk-receptacle and pressure in the chamber $m$. At the same time jets of warm milk are thrown against the teat and warm air is forced through the chamber $c$ by the pumping mechanism described. The alternating sucking and pressing are continued until it is noticed that the milk runs properly—i. e., in a strong stream. As soon as this is the case then turning of cock $g$ is no longer necessary, but the air-cock $r$ is closed, and then by opening the cocks a continuous vacuum is produced in the chamber $m$, so that the udder closes the two chambers $m$ and $c'$ to the outer air. The milk then runs continuously, and the duct $g'$ of cock $g$ carries the same into the vacuum-chamber B.

In another application, Serial No. 704,556, filed simultaneously with this, we have described and claimed means for injecting moist warm air into the chamber in which the teat is contained and throwing a jet of milk against the teat during the milking operation, also means for controlling the air-outlet from the vacuum-chamber, so as to prevent overflow of milk through said outlet.

We claim—

1. The combination of the outer udder-chamber $m$, inner teat-chamber $c'$, vacuum-chamber B and means for exhausting air therefrom, suitable controlling-cocks in the exhaust connections, pipes D and $o$, connecting the vacuum-chamber with the teat-chamber and udder-chamber respectively, and udder-massage device and teat-rubbers in the chambers $m$ and $c'$ respectively as shown and described to derive relative motion by atmospheric pressure in the operation of the apparatus.

2. The combination of the udder-chamber $m$ the udder-massage device $c^2$ provided with an extended permeable coating $c^3$ and constructed substantially as shown and described to derive motion relatively to the udder by intermittent atmospheric pressure; and air-exhausting apparatus, pipe connections and controlling-cocks in said connections to effect intermittent atmospheric pressure in said chamber as explained.

3. The combination of the vacuum-chamber B, means for exhausting air therefrom, udder-chamber $m$, teat-chamber $c'$, pipes D and $o$ connecting the vacuum-chamber with the teat-chamber and udder-chamber respectively and a controlling-cock $e$ therefor with separate ports at different angles, substantially as explained.

4. The combination of the udder-chamber $m$, teat-chamber $c'$, vacuum-chamber B and means for exhausting air therefrom, milk-receiving chamber B' connected with the vacuum-chamber B, the pipes D and $o$ connecting the vacuum-chamber with the teat-chamber and udder-chamber respectively, and the controlling-cock $g^3$ constructed with four ports in one plane, consisting of the inner parallel ports 1 and 2 and outer ports 3 and 4 at an angle thereto, substantially as shown and described.

GEORG SIEMSGLÜSS.
GEORG DASEKING.

Witnesses:
KIRKE LATHROP,
LEONORE KASCH.